US007289897B2

(12) United States Patent
Yokoyama et al.

(10) Patent No.: US 7,289,897 B2
(45) Date of Patent: *Oct. 30, 2007

(54) BRAKE DEVICE FOR VEHICLE (75) Inventors: Atsushi Yokoyama, Chiyoda (JP);
Takaomi Nishigaito, Chiyoda (JP);
Yuzo Kadomukai, Ishioka (JP);
Masanori Ichinose, Tsukuba (JP);
Kenichiro Matsubara, Chiyoda (JP);
Toshio Manaka, Hitachinaka (JP);
Nobuyuki Ueki, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/957,709

(22) Filed: Oct. 5, 2004

(65) Prior Publication Data
US 2005/0065696 A1   Mar. 24, 2005

Related U.S. Application Data (63) Continuation of application No. 10/067,288, filed on Feb. 7, 2002, now Pat. No. 6,810,316.

(30) Foreign Application Priority Data
Nov. 1, 2001   (JP) .............................. 2001-335952

(51) Int. Cl.
*B60T 13/00*   (2006.01)
(52) U.S. Cl. ........................................ 701/70; 180/156
(58) Field of Classification Search .................. 701/70; 303/3, 7, 152, 113.4, 20, 22.4, 9.63, 6.1; 180/156, 162, 1.11 L, 1.11 R; 340/453, 340/454, 451, 452, 522
See application file for complete search history.

(56) References Cited

U.S. PATENT DOCUMENTS
5,473,990 A   12/1995   Anderson et al.
(Continued)

FOREIGN PATENT DOCUMENTS
DE   198 53 036 A1   11/1998
(Continued)

OTHER PUBLICATIONS
U.S. Appl. No. 09/531,463, filed Mar. 20, 2000.
(Continued)

*Primary Examiner*—Dalena Tran
(74) *Attorney, Agent, or Firm*—Antonelli, Terry, Stout & Kraus, LLP.

(57) ABSTRACT

A brake device includes an actuator which is provided on a wheel side of a vehicle having a suspension, the actuator generates a braking force by being electrically driven. A drive controller is also provided for receiving a signal regarding the braking force from a vehicle motion controller and sensors, and driving the actuator accordingly. To reduce the number of high cost bending wires necessary to communicate between the sensors, the drive controller and the vehicle motion controller, the drive controller and the sensors are attached to the actuator side (unspring-mass).

14 Claims, 6 Drawing Sheets

U.S. PATENT DOCUMENTS

| | | |
|---|---|---|
| 5,572,187 A | 11/1996 | Williford |
| 5,772,289 A * | 6/1998 | Nakazawa et al. ......... 303/9.69 |
| 5,915,504 A | 6/1999 | Doericht |
| 5,973,463 A * | 10/1999 | Okuda et al. ............... 318/430 |
| 6,030,054 A | 2/2000 | Doericht |
| 6,109,702 A | 8/2000 | Horn et al. |
| 6,142,580 A * | 11/2000 | Sinn et al. .................... 303/20 |
| 6,208,921 B1 * | 3/2001 | Tsunehara et al. ............ 701/41 |
| 6,213,564 B1 * | 4/2001 | Face, Jr. ....................... 303/3 |
| 6,384,721 B1 | 5/2002 | Paielli |
| 6,397,981 B1 | 6/2002 | Tamasho et al. |
| 6,598,945 B2 | 7/2003 | Shimada et al. |
| 6,604,035 B1 * | 8/2003 | Wetzel et al. ................. 701/38 |

FOREIGN PATENT DOCUMENTS

| | | |
|---|---|---|
| DE | 197 42 988 C1 | 1/1999 |
| DE | 198 26 373 A1 | 12/1999 |
| DE | 199 26 495 A1 | 12/2000 |
| DE | 100 23 716 C1 | 10/2001 |
| JP | 5-147524 | 6/1993 |
| JP | 10-20338 | 8/1998 |
| JP | 11-171008 | 6/1999 |
| JP | 11-321599 | 11/1999 |
| WO | WO97/00785 | 1/1997 |
| WO | WO 00/47429 | 8/2000 |

OTHER PUBLICATIONS

U.S. Appl. No. 10/047,106, filed Jan. 17, 2002.

* cited by examiner

BRAKE DEVICE FOR VEHICLE

CROSS-REFERENCE TO RELATED APPLICATIONS

The present application is a Continuation of application Ser. No. 10/067,288, filed Feb. 7, 2002 now U.S. Pat. No. 6,810,316 and relates to subject matters described in application Ser. No. 09/531,463, filed on Mar. 20, 2001 (now U.S. Pat. No. 6,481,805) assigned to the assignee of the present application, and to application Ser. No. 10/047,106, filed on Jan. 17, 2002 by A. Yokoyama, T. Nishigaito, Y. Kadomukai, M. Ichinose, K. Matsubara, N. Ueki and T. Manaka and entitled "ELECTRICALLY DRIVEN BRAKE DEVICE AND CONTROL APPARATUS THEREOF" and assigned to the assignee of the present application. The disclosures of these applications are incorporated herein by reference.

BACKGROUND OF THE INVENTION

The invention relates to a brake device for an automobile and, more particularly, a vehicle-mounted brake device for generating a braking force by using an electric power.

Hitherto, a brake device for generating a braking force by making electrically driven motors operative has been known. For example, according to the brake device proposed in JP-A-11-321599, a vehicle motion controller transmits a required braking force to a drive controller in accordance with an output of a pedal sensor for detecting depression quantity of a brake pedal, an output of a thrust sensor for detecting a thrust of an actuator, and an output of a wheel speed sensor, and a frictional material is pressed onto a disk rotor by the actuator which is driven by the drive controller, thereby applying the braking force to wheels.

According to the brake device, advanced vehicle controls such as anti-lock control, automatic brake control, and the like and an adjustment of a brake feeling can be performed in correspondence to software. A parking brake can be also applied by using an actuator for vehicle control in common.

According to the conventional brake device, the vehicle motion controller and the drive controller are arranged on the vehicle body side (hereinafter, referred to as a spring-mass) of a vehicle having suspensions. The spring-mass is constructed by a body, an engine and a transmission which are mounted on the body, the interior, and the like. The actuator, thrust sensor, and wheel speed sensor are arranged on the wheel side (hereinafter, referred to as a unspring-mass) which is interlocked with a vertical displacement of the wheel or a motion of a steering when the vehicle body is fixed. The unspring-mass is constructed by a suspension, a knuckle, an axle, the wheel, and the like.

The drive controller and the actuator, the vehicle motion controller and the thrust sensor, and the vehicle motion controller and the wheel speed sensor are connected by electric wires, respectively. A relative displacement occurs between the spring-mass and the unspring-mass due to the motion of the suspension or the steering. Since the displacement is absorbed by deformation of the electric wires, the electric wires between the spring-mass and the unspring-mass require excellent flexibility. In addition to it, since a strength is also required in terms of countermeasures against a stone hit and freezing, a special electric wire called a bending cable is used as an electric wire. An expensive resin is also used as a sheath of the wire. A connector having excellent waterproof is necessary in a connecting portion of the electric wire and this becomes a cause of an increase in costs.

According to the conventional brake device, three bending cables for connecting the drive controller and the actuator, the vehicle motion controller and the thrust sensor, and the vehicle motion controller and the wheel speed sensor are wired with respect to each wheel, so that there is a waste of cost. A troublesomeness of wiring and the number of fixing parts which are used also increase, so that they also exert an influence on the costs. In the case where a DC brushless motor or an AC motor is used for the actuator, since a large alternating current is supplied between the drive controller and the actuator, there is a risk that noises are introduced into an ambient analog signal lines. Therefore, a cost for taking a countermeasure against the noises is needed and this exercises an influence on the costs.

SUMMARY OF THE INVENTION

It is an object of the invention to provide a cheap brake device by reducing a cost of a bending cable.

The above object is accomplished by a construction such that a drive controller is attached onto an actuator side and communication with a vehicle motion controller which is arranged on the vehicle body side of a vehicle is made by bidirectional multiplex communication. Thus, not only a signal of the vehicle motion controller can be transmitted to the drive controller only by a signal line with a double core, but also information from a plurality of sensors provided for the drive controller can be transmitted to the vehicle motion controller. Therefore, the number of bending cables can be reduced and an object such that an inexpensive brake device is provided can be realized.

At this time, it is desirable that the signal line connecting the drive controller and the vehicle motion controller and an electric power line for supplying an electric power to the drive controller are constructed by a single cable covered with a same sheath in a portion connecting the vehicle body side and the wheel side. Thus, since the number of bending cables can be set to one, the object to provide an inexpensive brake device can be realized.

It is also preferable that the electric power line for the bending cable is a twisted pair-wire and the signal line is a coaxial wire. Thus, since an influence by noises exerted on a digital signal line by a DC power line is small, the electric power line can be constructed by a twisted pair-wire of a low cost. Consequently, the object to provide an inexpensive brake device can be realized.

It is desirable that communication information of the drive controller and the vehicle motion controller is transmitted by using the electric power line for supplying the electric power to the drive controller. Thus, since a core wire only for use in the signal line becomes unnecessary, the number of core wires in the bending cable can be reduced and the object to provide an inexpensive brake device can be realized.

It is also preferable that communication information of the drive controller and the vehicle motion controller is transmitted by radio communication. Thus, since a core wire only for use in the signal line becomes unnecessary, the number of core wires in the bending cable can be reduced and the object to provide an inexpensive brake device can be realized.

It is also preferable to electrically connect a wheel speed sensor for detecting a rotational speed of the wheel to the drive controller. Thus, the number of bending cables can be reduced and the object to provide a cheap brake device can be realized. Further, the drive controller can control the actuator at higher precision by using information of the wheel speed sensor.

It is also desirable to electrically connect a pad abrasion sensor for detecting abrasion of a brake pad to the drive controller. Thus, since a signal line only for use of a signal from the pad abrasion sensor does not need to be wired to the spring-mass, the number of bending cables can be reduced and the object to provide an inexpensive brake device can be realized. Further, the drive controller can control the actuator with higher reliability by using information of the pad abrasion detecting sensor.

It is also preferable to electrically connect a pneumatic sensor receiver for receiving a radio signal from an air pressure sensor provided for a tire to the drive controller. Thus, since a signal line only for use of a signal from the air pressure sensor does not need to be wired to the spring-mass, the number of bending cables can be reduced and the object to provide an inexpensive brake device can be realized. Further, the drive controller can control the actuator with higher reliability by using information of the air pressure sensor.

The above object is also accomplished by a construction such that the driver controller is arranged on the vehicle body side of a vehicle and, in a portion connecting the vehicle body side and the wheel side, the signal line connecting the drive controller and the actuator is constructed by one cable covered with a same sheath. Thus, since an expensive sheath is unnecessary every signal line, the object to provide a cheap brake device can be realized. Further, by constructing the power line and the signal line by the different cables, a cost which is necessary for a countermeasure against the noises can be reduced and a cheap brake device can be provided.

Other objects, features and advantages of the invention will become apparent from the following description of the embodiments of the invention taken in conjunction with the accompanying drawings.

DESCRIPTION OF THE EMBODIMENTS

Figure 1:
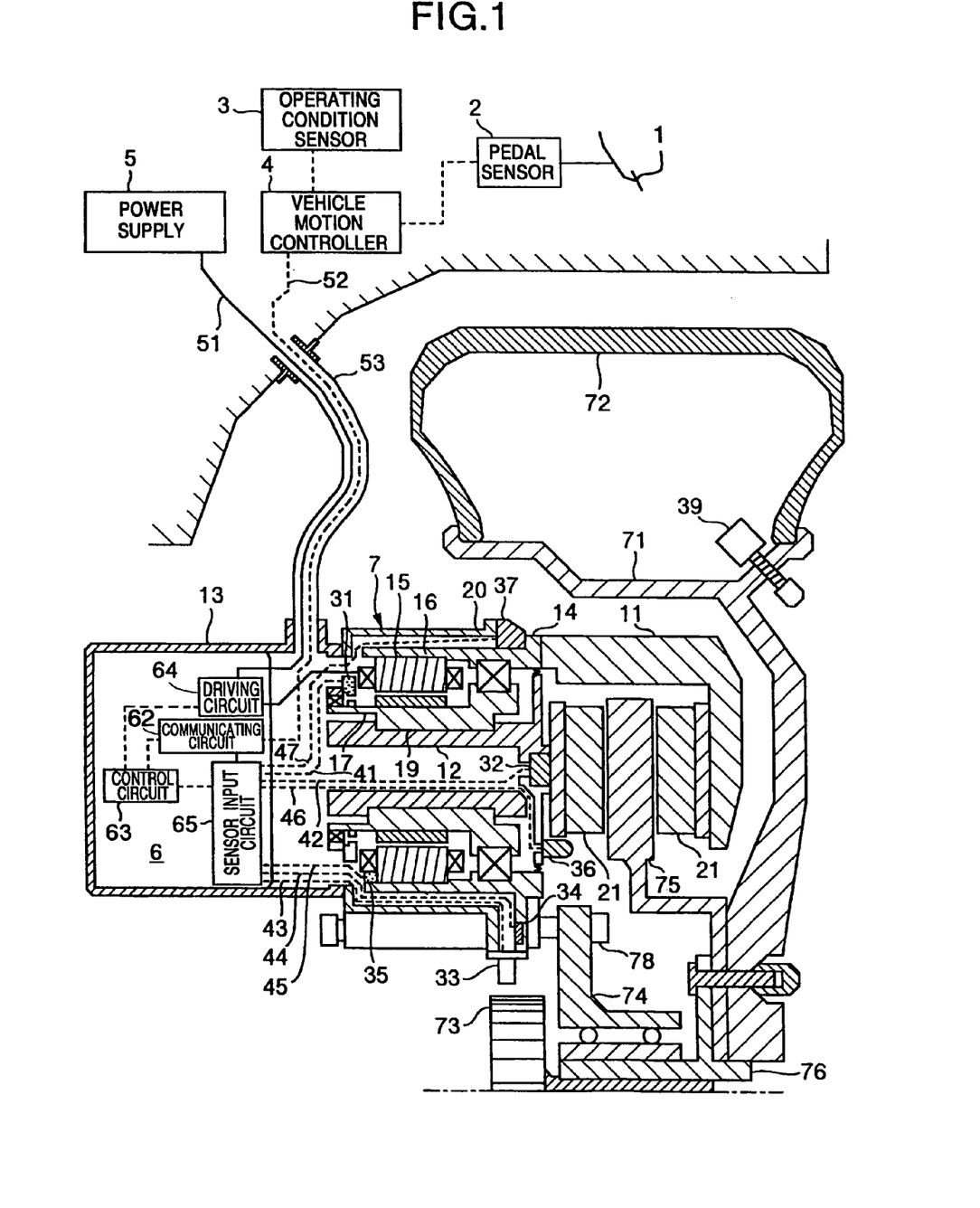
FIG. 1 is a diagram showing an embodiment of a brake device of the invention.

FIG. 1 is a diagram showing an embodiment of a brake device of the invention.

The brake device is constructed by: a brake pedal 1; a pedal sensor 2 for detecting depression quantity of the brake pedal; an operating condition sensor 3; a vehicle motion controller 4 for calculating a braking force; a power supply source 5; an actuator 7 as an electrically driven braking force generating mechanism; a drive controller 6 for driving the actuator 7 and, at the same time, transmitting and receiving a signal; and a caliper 11. The brake pedal 1, pedal sensor 2, operating condition sensor 3, vehicle motion controller 4, and power supply source 5 are arranged to the spring-mass. The drive controller 6, actuator 7, and caliper 11 are arranged to the unspring-mass.

The drive controller 6 is constructed by: a communicating circuit 62 for performing bidirectional multiplex communication of a digital signal with the vehicle motion controller 4; a sensor input circuit 65 for receiving an analog signal from a sensor provided for the actuator 7; a driving circuit 64 for driving a motor 15; and a control circuit 63 for controlling the driving circuit 64 in accordance with signals from the communicating circuit 62 and sensor input circuit 65. The drive controller 6 is fixed to a casing 13. The casing 13 is fixed to the actuator 7.

The actuator 7 is constructed by: a housing 14; the motor 15; a stator 16 as a fixed portion to the housing 14 of the motor 15; a rotor 17 as a rotational portion of the motor 15; a screw portion 19 for converting a rotation of the rotor 17 into a linear motion; a piston 12 for obtaining a thrust from a rotational motive power of the rotor 17; and two pads 21 which receive the thrust of the piston 12 and sandwich a disk rotor 75.

As mentioned above, the drive controller 6 is provided on the side of a tire 72 and fixed to the actuator 7. However, the casing 13 to which the drive controller 6 has been fixed can be also fixed to the housing 14 of the actuator 7. A circuit apparatus constructing the drive controller 6 can be also directly provided, for example, on the housing 14. According to the latter structure, the number of parts can be reduced, the construction is simple, it can be easily assembled, and the costs can be reduced.

The actuator 7 and pads 21 are fixed to the caliper 11 of the floating type. The caliper 11 is supported to a unspring-mass fixing portion 74 by a slide pin bolt 78 so as to be slidable in the axial direction (left/right direction in the diagram) of the motor 15. The unspring-mass fixing portion 74 is interlocked with a motion of a suspension or a steering. The disk rotor 75 fixed to a hub 76 is arranged between the two pads 21. A frictional force which acts on the pads 21 and disk rotor 75 is transferred onto the road surface via a wheel 71 and the tire 72 and produces a braking force of the vehicle. A slit rotor 73 for a wheel speed sensor is rotated in an interlocking manner with the hub 76. An air pressure sensor 39 for detecting an air pressure of the tire is provided for the wheel 71 and transmits a radio signal according to the detected air pressure to an air pressure sensor receiver 37 provided for the actuator 7. Since the air pressure sensor receiver 37 is provided for the actuator 7 as mentioned above, a distance between a transmitter and the receiver is shorter than that in the case where the receiver is provided for the spring-mass, and a change in relative position due to the motion of the suspension does not occur. Therefore, the signal transmission and reception can be stably performed with a small electric power.

The actuator 7 is provided with: a rotational angle sensor 31 for detecting a rotational angle of the motor 15; a thrust sensor 32 for detecting the thrust of the piston 12; a wheel speed sensor 33 for detecting a rotational speed of the wheel; a braking force sensor 34 for detecting a load acting on the caliper in accordance with the braking force; a temperature sensor 35 for detecting a temperature of the motor 15; a pad abrasion sensor 36 for detecting an abrasion state of the pad 21; and the pneumatic sensor receiver 37. The rotational angle sensor 31 is, for example, a Hall element, an encoder, a resolver, or the like. The thrust sensor 32 and braking force sensor 34 are, for example, load cells of the strain gauge type. The wheel speed sensor 33 is, for example, a magnetic sensor for generating a pulse voltage in accordance with the rotation of the slit rotor 73. The temperature sensor 35 is, for example, a thermocouple. The pad abrasion sensor 36 is, for example, a sensor of the disconnection detecting system for detecting a resistance change which is caused by a disconnection of the electric wire in the sensor. When the disk is come into contact with the sensor due to the abrasion of the pad, the electric wire in the sensor is disconnected, thereby making it possible to detect that an abrasion amount of the pad 21 exceeds a predetermined amount.

Analog signals which are generated from those sensors are sent to the drive controller 6 via signal lines 41 to 47 connecting the sensors and the drive controller 6. Since the signal lines 41 to 47 pass in the actuator 7, there is no need to take into consideration an influence by the waterproof performance or stone hit every electric wire, so that a cheap brake device can be provided. By electrically connecting a plurality of sensors to the drive controller 6 having the multiplex communicating function, the number of signal lines can be reduced to a value smaller than that in the case where the signal of each sensor is connected to the spring-mass by a dedicated signal line.

The power supply source 5 and drive controller 6 are connected by an electric power line 51 of a double core. A direct current is supplied to the power line 51. The vehicle motion controller 4 and drive controller 6 are connected by a signal line 52 of a double core and the signals are transmitted by, for example, a digital bidirectional multiplex communication such as a CAN (Control Area Network). By multiplexing the signals, not only the signal of the vehicle motion controller 4 can be transmitted to the drive controller 6 only by the signal line of the double core, but also information of a plurality of sensors provided for the drive controller can be transmitted to the vehicle motion controller 4. A portion connecting the spring-mass and the unspring-mass in the power line 51 and signal line 52 constructs a bending cable 53 covered with a same sheath.

Figure 2:
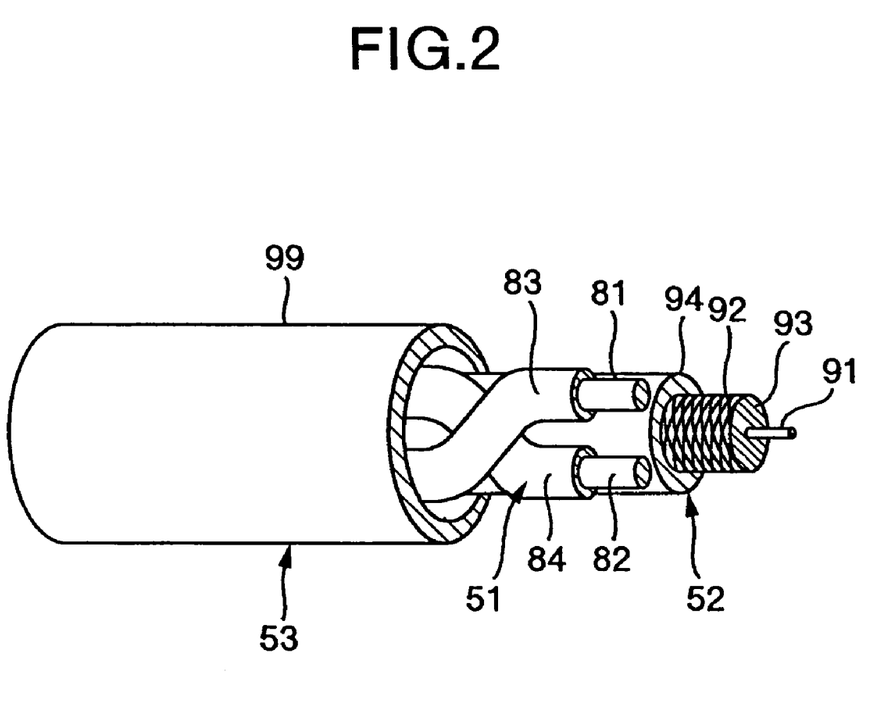
FIG. 2 is a diagram showing a bending cable of the invention.

FIG. 2 shows a cross sectional view of the bending cable 53. The power line 51 is a twisted pair-wire constructed by two core wires 81 and 82 and their sheaths 83 and 84. The signal line 52 is a coaxial wire constructed by two core wires 91 and 92, an insulative layer 93, and a sheath 94. The power line 51 and signal line 52 are covered with a sheath 99 having excellent bending performance and strength, thereby constructing the bending cable 53.

Since the bending cable 53 is constructed by a total of four core wires as mentioned above, the bending cable can be realized by a single cable with a diameter smaller than that in case of constructing a bending cable by the power line and signal line of the larger number of core wires than 4. By using the bending cable constructed by the DC power line and the digital signal lines, the number of bending cables connecting the spring-mass and the unspring-mass can be reduced to one and the brake device of a low cost can be provided. Further, since a combination of the direct current and the digital signals passes through the bending cable 53, influences by the noises which are exercised on the signal lines by the power line are smaller than those in the case where an AC or a motor drive current flows in the power line or the case where the signal lines are analog lines. Therefore, as shown in FIG. 2, the power line 51 can be constructed by the twisted pair-wire of a low cost and only the signal line can be constructed by the coaxial wire of a high cost. Thus, the costs which are used for the countermeasure against the noises can be also reduced and the inexpensive brake device can be provided.

The operation of the brake device having the foregoing construction will be described hereinbelow.

The pedal sensor 2 generates an electric signal according to the depression quantity of the brake pedal 1. The operating condition sensor 3 detects, for example: a speed of the vehicle; acceleration of the vehicle; a turning angular velocity of the vehicle; depression quantity of an accelerator pedal by the driver; a throttle opening degree of an engine; a steering angle of a steering apparatus; a headway distance between his own vehicle and an ahead running vehicle and a relative speed therebetween; the presence or absence of an obstacle; the road grade; and the like. The operating condition sensor 3 sends an electric signal according to each operating condition to the vehicle motion controller 4. Information regarding operating modes of the actuator such as rotational angle of the motor, piston thrust, braking force, motor temperature, and the like and information regarding the wheel speed, the air pressure of the tire, the abrasion state of the pad, and the like are sent to the vehicle motion controller 4 from the drive controller 6.

The vehicle motion controller 4 computes a target braking force of each wheel on the basis of the signals from the pedal sensor 2, operating condition sensor 3, and drive controller 6 and transmits a digital signal according to a magnitude of the calculated target braking force to the drive controller 6. The drive controller 6 controls the motor 15 of the actuator 7 so that the braking force of the wheel is equal to the target braking force that is required by the vehicle motion controller 4. At this time, the drive controller 6 feeds back the signals of the rotational angle sensor 31, thrust sensor 32, and braking force sensor 34, thereby controlling the braking force. Further, when information indicative of an abnormal state is included in the information from the temperature sensor 35, pad abrasion sensor 36, or air pressure sensor 39, the drive controller 6 transmits a signal to inform the abnormality to the vehicle motion controller 4 and controls the actuator 7 in accordance with the abnormal state so as to avoid a danger to the vehicle. For example, when the temperature sensor indicates an abnormal high temperature, the current which is supplied to the motor is limited in accordance with such a temperature. When the pad abrasion sensor 36 shows that the abrasion amount of the pad has reached a predetermined abrasion amount, a warning to urge the driver to exchange the pad is generated. When the air pressure sensor 39 indicates an abnormal decrease in air pressure, a warning to urge the driver to fill air into the tire is generated and, at the same time, the braking force is limited to a value to an extent such that a damage of the tire is not caused.

Figure 3A:
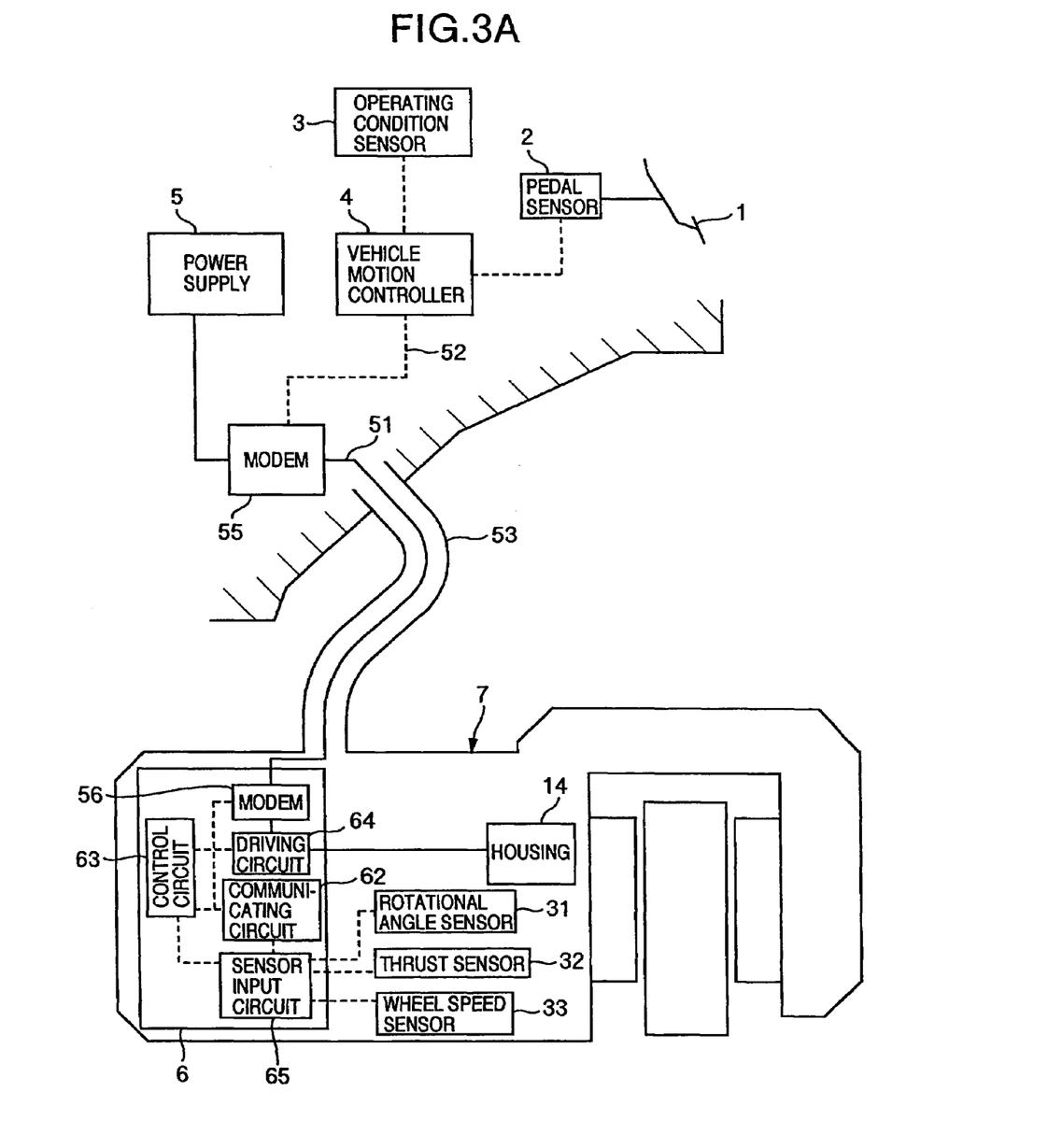
FIGS. 3A and 3B are diagrams showing other embodiments of a brake device of the invention.

In the embodiment, although the information of the communication between the vehicle motion controller 4 and drive controller 6 has been transmitted by the signal line 52, the signal can be also transmitted by the power line 51 as shown in FIG. 3A. At this time, modems 55 and 56 for inputting the signal are provided on both sides of the spring-mass and the unspring-mass of the power line 51. Thus, the number of core wires in the bending cable is equal to two and the cheaper brake device can be provided.

Figure 3B:
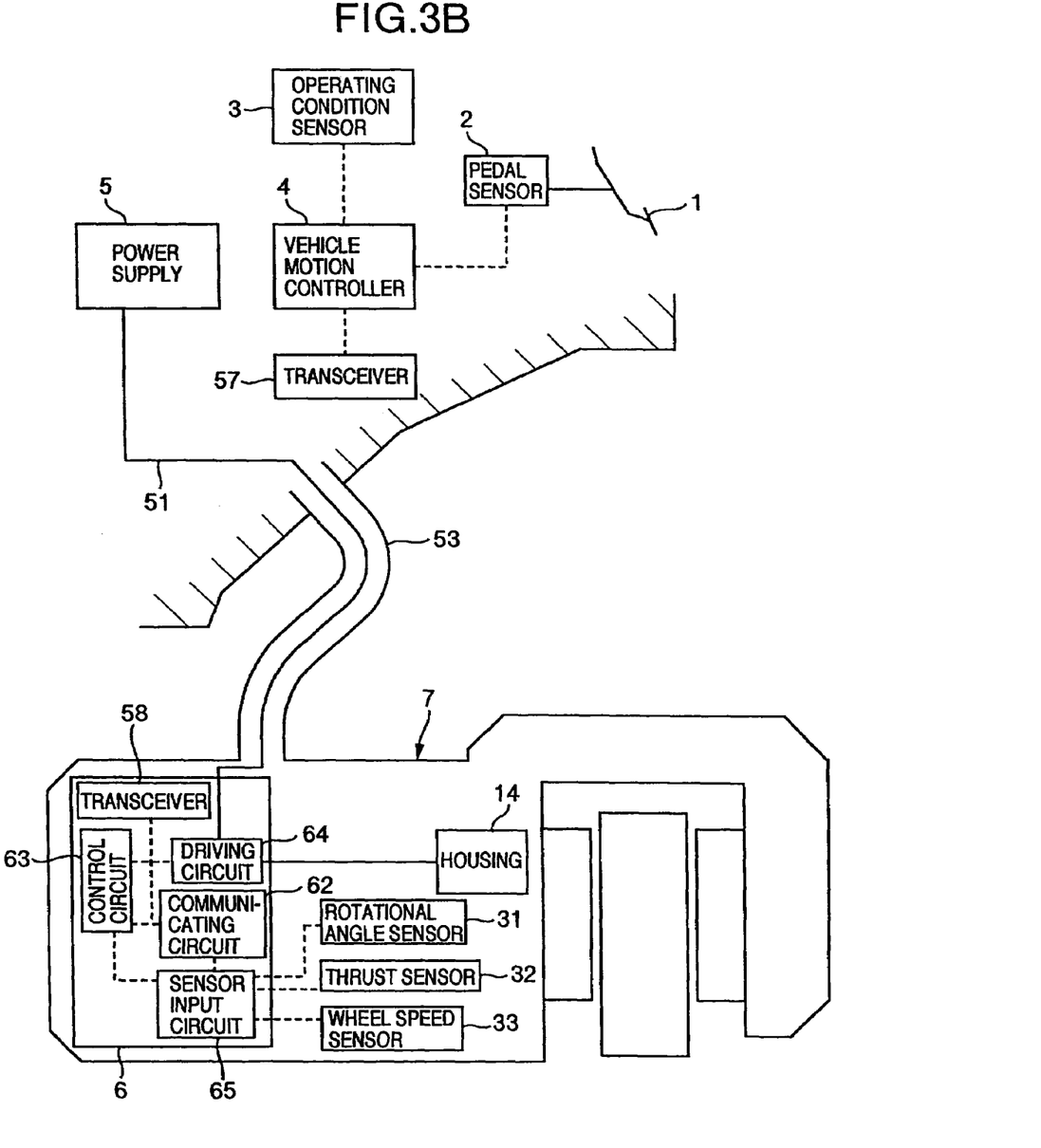

In the embodiment, although the information of the communication between the vehicle motion controller 4 and drive controller 6 has been transmitted by the signal line 52, the signal can be also transmitted and received in a wireless manner as shown in FIG. 3B. At this time, transceivers 57 and 58 are provided for the spring-mass and the unspring-mass, respectively. Thus, the number of core wires in the bending cable is equal to two (power lines) and the more inexpensive brake device can be provided.

In the embodiment, although the power line 51 is constructed by two core wires, the power line 51 can be also constructed by a single core wire by making a grounding line of the power line 51 common to the body earth. At this time, the body earth of the spring-mass is used in common with the earth of the drive controller 6 via the suspension and the steering mechanism. Thus, the number of core wires of the power line is reduced to one and the more inexpensive brake device can be provided.

Although the wheel speed sensor 33 and actuator 7 have been integratedly constructed in the embodiment, the wheel speed sensor 33 can be also separately constructed. At this time, a cable of the wheel speed sensor 33 is connected to the drive controller 6. In this instance, it is not always necessary that the cable connecting the wheel speed sensor 33 and drive controller 6 is a bending cable having excellent bending performance. Thus, even if it is difficult to integratedly construct the wheel speed sensor and the actuator because of limitation of a layout of the unspring-mass, the number of expensive bending cables is reduced to one and the more inexpensive brake device can be provided.

Figure 4A:
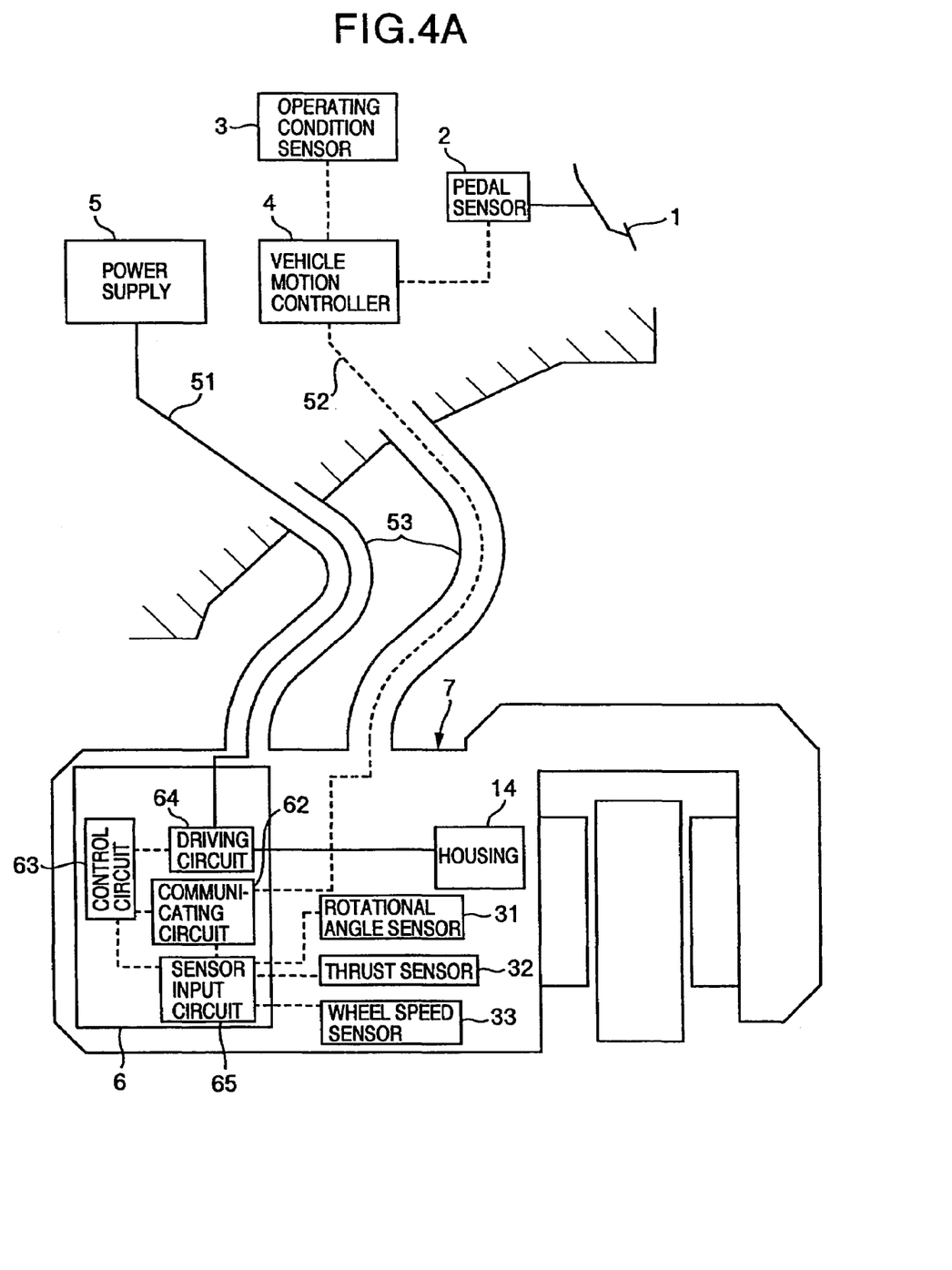
FIGS. 4A and 4B are diagrams showing other embodiments of a brake device of the invention.
Figure 4B:
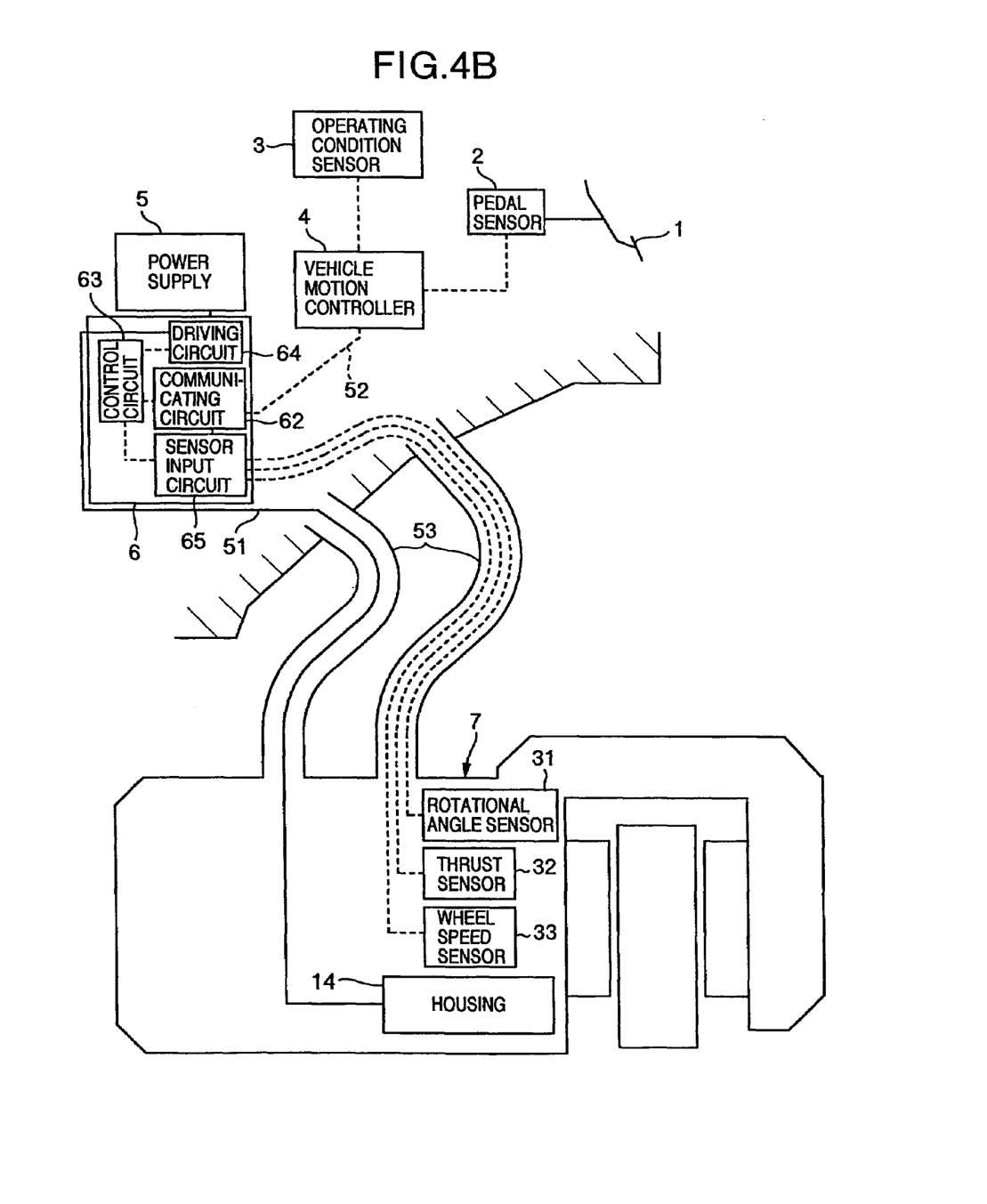

Although the power line 51 and signal line 52 have been bound as a single bending cable in the embodiment, as shown in FIG. 4A, the power line 51 and signal line 52 can be also separately constructed by two bending cables. At this time, not only the number of bending cables can be reduced to a value smaller than the three bending cables used in the prior art device but also the power line 51 and signal line 52 can be arranged so as to be away from each other by separating them. The cost which is used for the countermeasure against the noises can be reduced. Further, even in the case where the drive controller 6 has to be arranged to the spring-mass because of limitation of a layout of the unspring-mass as shown in FIG. 4B, a construction similar to that mentioned above can be also used. In this instance, although the signal line in the bending cable is the analog line and the number of core wires increases, by separating the power line and the signal line as mentioned above, the cost which is used for the countermeasure against the noises can be reduced. Therefore, the inexpensive brake device can be provided.

Although the embodiment has been described with respect to the brake device having the electrically driven motor as an actuator, the invention can be also easily applied to a brake device having an electronically controlled hydraulic actuator. For example, the invention can be also applied to a brake device having an electronically controlled hydraulic motor in place of the motor 15. The invention can be also applied to a brake device which has a hydraulic piston as an actuator and in which a hydraulic control is performed by an electronically controlled hydraulic valve. In the case where those brake devices have a plurality of sensors provided for the unspring-mass, by arranging the communicating circuit to the unspring-mass and transmitting the information to the electronic control circuit of the spring-mass by the multiplex communication, the number of bending cables can be reduced and an inexpensive vehicle system can be provided.

As mentioned above, according to the brake device of the invention, the number of expensive bending cables connecting the spring-mass and the unspring-mass can be reduced. Therefore, the inexpensive brake device can be provided.

It should be further understood by those skilled in the art that the foregoing description has been made on embodiments of the invention and that various changes and modifications may be made in the invention without departing from the spirit of the invention and the scope of the appended claims.

What is claimed is:

1. A brake device comprising:
   an actuator which is provided on an unspring-mass wheel side of a vehicle having a suspension and which is adapted to generate a braking force by being electrically driven;
   a drive controller to receive a signal regarding the braking force from a vehicle motion controller and to drive said actuator, wherein said vehicle motion controller is located at a spring-mass vehicle body side of said vehicle,
   a sensor device to detect operating values of said actuator and to provide said operating values to said drive controller, said sensor device being disposed at the unspring-mass wheel side of the vehicle, and
   a signal line connecting said drive controller and said vehicle motion controller, said signal line being adapted to communicate between said drive controller and said vehicle motion controller in bidirectional multiplex communication,
   wherein said drive controller is located at the unspring-mass wheel side of the vehicle,
   wherein said drive controller is adapted to send a signal to a spring-mass vehicle body side of said vehicle and to receive a signal from said spring-mass vehicle body side of said vehicle, and
   wherein, in a portion connecting the spring-mass vehicle body side and the unspring-mass wheel side, said signal line and a power line supplying electric power to said drive controller are connected by a single cable covered with a same sheath.

2. A brake device according to claim 1 wherein said drive controller is adapted to send a signal to a spring-mass vehicle body side of said vehicle and to receive a signal from said spring-mass vehicle body side of said vehicle by the same signal line.

3. A brake device according to claim 1, wherein said power line of said cable is a twisted pair-wire.

4. A brake device according to claim 1, wherein said signal line of said cable is a coaxial wire.

5. A brake device according to claim 1, wherein communication information of said drive controller and said spring-mass vehicle body side of said vehicle is transmitted by using a power line supplying electric power to said drive controller.

6. A brake device according to claim 1, wherein said sensor device includes a wheel speed sensor to detect a rotational speed of the wheel, and wherein said wheel speed sensor and said drive controller are electrically connected with each other.

7. A brake device according to claim 1, wherein said sensor device includes a pad abrasion sensor to detect an abrasion of a brake pad, and wherein said pad abrasion sensor and said drive controller are electrically connected with each other.

8. A brake device according to claim 1, wherein said sensor device includes an air pressure sensor receiver to receive a radio signal from an air pressure sensor provided for a tire, and wherein said air pressure sensor receiver and said drive controller are electrically connected with each other.

9. A brake device according to claim 1, wherein said drive controller is adapted to send a signal to the vehicle motion controller and receives a signal from said vehicle motion controller.

10. A brake device according to claim 9, wherein said vehicle motion controller is located on a spring-mass vehicle body side of the vehicle.

11. A brake device according to claim 1, wherein said drive controller is adapted to send a signal to the vehicle motion controller and receives a signal from said vehicle motion controller by the same signal line.

12. A brake device according to claim 11, wherein said drive controller and said vehicle motion controller are each connected to a power line for supplying electric power to said drive controller to permit transmission of communication information of said drive controller and said vehicle motion controller by using said power line.

13. A brake device according to claim 12, wherein said vehicle motion controller is located on a spring-mass vehicle body side of the vehicle.

14. A brake device according to claim 11, wherein said vehicle motion controller is located on a spring-mass vehicle body side of the vehicle.

* * * * *